United States Patent [19]

Hagelbarger

[11] 3,904,887

[45] Sept. 9, 1975

[54] SNAP-ACTION PUSHBUTTON SWITCH

[75] Inventor: David William Hagelbarger, Morristown, N.J.

[73] Assignee: Bell Telephone Laboratories, Incorporated, Murray Hill, N.J.

[22] Filed: Mar. 25, 1974

[21] Appl. No.: 454,073

[52] U.S. Cl. .............................. 307/139; 340/365 C

[51] Int. Cl.$^{2}$ .............................. H01H 9/54

[58] Field of Search ............ 317/242, 249 R, 249 D, 317/249 T; 335/206, 205; 178/17 A, 17 C, 79, 81; 340/365 L, 365 C; 200/67 F, 159 A; 307/139, 112, 116, 308, 218

[56] References Cited

UNITED STATES PATENTS

| | | | |
|---|---|---|---|
| 3,308,276 | 3/1967 | Panagiotou et al. | 307/218 X |
| 3,448,419 | 6/1969 | Myatt | 335/206 |
| 3,586,888 | 6/1971 | Dorfman | 335/205 |

OTHER PUBLICATIONS

IBM Technical Disclosure Bulletin, pages 3301–3302, Vol. 13, No. 11, April 1971.

*Primary Examiner*—Robert K. Schaefer
*Assistant Examiner*—M. Ginsburg
*Attorney, Agent, or Firm*—C. S. Phelan

[57] ABSTRACT

In a pushbutton switch one conductive plate is formed on a fixedly mounted printed circuit board. The other plate is comprised of a cantilever spring-mounted, movable, conductive, plate parallel with but spaced apart from the fixed plate. A pushbutton, constrained to move along a line perpendicular to the fixed and movable plates, is located opposite to the movable plate with the fixed plate in between. On the back side of the pushbutton is a small permanent magnet having a surface area approximately equal to that of the fixed and movable plates. Upon depression of the pushbutton the magnetic force of the magnet overcomes the spring force of the cantilever springs on the movable plate and snaps it into contact with the fixed plate. A stepwise change in impedance between the two conductive plates produced by depression of the pushbutton is detected providing an indication that the switch has been operated.

15 Claims, 3 Drawing Figures

SNAP-ACTION PUSHBUTTON SWITCH

BACKGROUND OF THE INVENTION

1. Field of the Invention

This invention relates to pushbutton switches and, in particular, to pushbutton switches that utilize a stepwise change in impedance to provide an indication of switch operation.

2. Description of the Prior Art

In a communications system a wide variety of switches are used in a wide variety of applications. For example, crossbar and reed switches are used in telephone switching machines; toggle switches are used on power supplies and the like; and pushbutton switches are used in control circuits, keyboards, telephone dials and other related applications. Pushbutton switches may further be grouped in accordance with their electrical operating characteristics. Examples of classifications according to electrical operating characteristics include resistive, inductive and capacitive switches and electret switches.

Regardless of the electrical classification, pushbutton switches typically possess a number of drawbacks. In all cases either complex mechanical structures or complex electrical circuitry must be employed if a positive snap-action type of switch closure is to be obtained. For example, in resistive-type switches snap-action effects are obtained typically by a slide actuated snap release of detent springs. Such mechanisms are subject to abrasive wear which can eventually cause the switch to malfunction.

Inductive-type pushbutton switches usually operate in conjunction with an oscillator circuit. As the pusbutton is depressed a plunger is moved through a coil in the oscillator circuit thereby changing the frequency of oscillation. In order to determine that the switch has been operated complex frequency detection circuitry is required. Moreover, any snap-action operation gives rise to ringing in the circuitry further complicating the already complex frequency detection circuitry.

In capacitive-type pushbutton switches large variations in capacitance are difficult to achieve and to obtain a snap-action effect heretofore required a push-pull capacitance variation between a pair of fixed plates and a movable plate. This usage of a pair of fixed plates complicates both the mechanical and electrical design. Capacitive-type pushbutton switches are also susceptible to particles of foreign matter becoming lodged between the capacitor plates, such particles changing the capacity so that on/off capacitance ratios and outputs are often below the switching threshold.

Electret switches which operate on a principal somewhat akin to a capacitive switch suffer from a not too easily explained shortcoming. In an electret unit an electrostatic charge is placed on a piece of dielectric material. This charge is retained for an indefinite period. One side of the charged dielectric material is covered with a metallic foil. This foil forms one plate of a parallel plate capacitor. The other plate of the capacitor is formed typically by imbedding a recessed metallic plate in an insulating material. As the switch is operated the foil covered dielectric material is moved into the air gap defined by the recess thereby causing a charge to be coupled to the recessed plate. However, because any detector circuit has a finite impedance associated therewith, as an electret pushbutton is slowly depressed, the voltage resulting from the transfer of charge is dissipated in the finite impedance of the detector rather than building up on the opposite plate of the capacitor. In addition when this charge dissipation effect occurs it is possible to have a pushbutton depressed but not be able to detect a positive indication of such depression.

Accordingly, it is one object of the present invention to configure a snap-action pushbutton switch which does not require a complex mechanical structure to effect a positive, snap-action switch actuation.

A further object of the present invention is to provide for stepwise changes of impedance to indicate switch operation.

An additional object is to configure a pushbutton switch which provides a continuous indication of key position while it is depressed.

Still another object of the present invention is to seal all of the electrical switch elements from adverse environmental effects.

Yet a further object is to develop a pushbutton switch which is inexpensive to manufacture, simple to fabricate and virtually failure proof in operation.

SUMMARY OF THE INVENTION

The foregoing and other objects of the invention are realized in an illustrative embodiment wherein first and second electrically conductive members, one of which is fixedly mounted and the other of which is movable, are disposed between a magnetic member and a movable magnet. The magnetic member is either affixed to the movable conductive plate or is an integral part thereof. Movement of the magnet along a line perpendicular to first and second parallel planes containing the fixed and movable conductive members, the movement being constrained to a predetermined distance, results in the movable member being snapped from a first position spaced apart from the fixed member to a second position juxtaposed to the fixed member.

This snap-action actuation alters an elected impedance between the electrically conductive members in a stepwise fashion. The impedance alteration produces a phase change in an interrogation signal. Detection of the phase change gives an indication that the switch has been operated.

The fixed and movable members are encased in a molded dust cover to keep out any foreign particulate matter which might adversely affect switch operation.

Accordingly, it is one feature of the present invention that the pushbutton switch has a snap-action positive actuation upon depression of the pushbutton to effect a stepwise change in impedance.

Another feature is that the electrically operative elements are housed in a sealed chamber to keep out harmful particulate matter such as dust and dirt.

It is a further aspect of the invention that the movable plate is confined in its distance of travel so that rough treatment such as dropping does not overstress its mounting structure.

Still another feature is that switch operation is virtually failure proof since a short circuit between the conductive members in a capacitive mode of operation results in resistive operation and, conversely, an open circuit between the conductive members in a resistive mode of operation results in capacitive operation with no alterations required in the interrogation signal circuitry.

Yet another feature is that the switch can be utilized in low power, low voltage circuit applications.

BRIEF DESCRIPTION OF THE DRAWINGS

The aforementioned aspects, features and objects of the invention as well as other aspects, features and objects will be better understood upon a consideration of the following detailed description and the appended claims in connection with the attached drawings of an illustrative embodiment in which:

DETAILED DESCRIPTION

Figure 1:
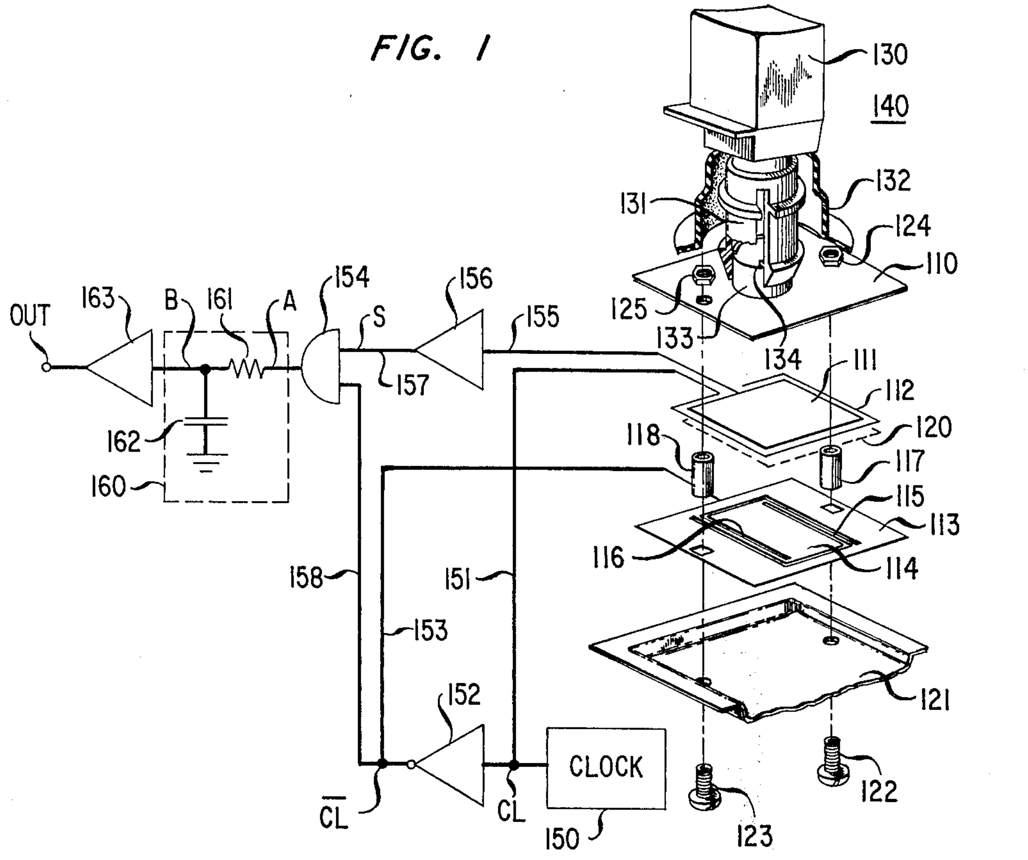
FIG. 1 is a partially exploded view of the mechanical switch structure with a block diagram schematic representation of the electrical circuitry as it would be coupled to the mechanical elements of the switch.

The pushbutton switch illustrated in FIG. 1 is best described by separating the switch operating characteristics into two distinct segments—mechanical operation and electrical operation. In the mechanical portion of the description, mechanical interrelationships of the various switch elements will be described to the exclusion of any electrical properties which these elements might possess. Correspondingly, in the electrical portion of the description the electrical interrelationships of the various switch circuitry will be described, but in this description it will be necessary to utilize in a peripheral sense some of the mechanical properties previously discussed. Utilization of this approach should result in a simplification of the description of the overall switch characteristics.

1. Mechanical Operation

The basic mechanical elements of the switch, as illustrated in FIG. 1, are fixedly mounted conductive plate 111 and movable conductive plate 114. Fixed plate 111 is formed by etching one side of a single-sided printed circuit board 110. Circuit board 110 is fixed to an appropriate housing (not shown) and pushbutton 140 is constrained by the same housing to movement along a line perpendicular to circuit board 110. Also etched on the circuit board 110 is a guard circuit 112.

Guard circuit 112 entirely surrounds fixed plate 111, except for a gap at the midpoint of one edge of fixed plate 111, and it is spaced apart from fixed plate 111 a sufficient distance which permits any electrical signals applied to the guard circuit 112 to be capacitively coupled to the fixed plate 111.

Movable plate 114 is formed by punching or etching a magnetic steel support strip 113, with the material that is punched or etched away leaving two U-shaped patterns. The two U-shaped patterns are oppositely directed with respect to one another with one leg of each U being just inside but adacent to a leg of the other U. Punching or etching such a pattern leaves movable plate 114 connected to support strip 113 by cantilever springs 115 and 116. Support strip 113, including movable plate 114, is spaced about one one-hundredth of an inch below circuit board 110 by spacers 117 and 118 with fixed plate 111 being adjacent to movable plate 114.

A dielectric film 120 is placed over the fixed plate 111 and guard circuit 112 so as to be interposed between the fixed plate 111 and movable plate 114. Switch actuation is effected by a capacitive coupling of signals from the movable plate 114 to the fixed plate 111. In some embodiments dielectric film 120 could be advantageously omitted if a resistive switch operation is desired. More details with regard to the electrical effects between fixed plate 111 and movable plate 114 will be provided in the electrical section of this description.

The entire assembly of fixed plate 111 and movable plate 114 is sealed from dust, dirt and other particulate contaminants by enclosing it in enclosure 121. Enclosure 121, by constraining the maximum travel limits of movable plate 114, prevents any overstressing of cantilever springs 115 and 116 should a switch unit be dropped or handled in any other rough manner. Attachment of enclosure 121 to circuit board 110 is effected by bolts 122 and 123 in conjunction with nuts 124 and 125.

Mechanical operation of the switch will be more completely described following completion of the description dealing with the mechanical switch configuration. For present purposes some operational details will be discussed but only to the extent necessary to complete the description of the mechanical interrelationship of the various switch elements. A mechanical switch actuation is implemented by manual depression of pushbutton 140 which in turn magnetically attracts movable plate 114 bringing it from a quiescent position to an operating position contiguous with fixed plate 111. The difference in distance between these two positions of the movable plate 114 is on the order of 10 to 20 mils. The spacing between fixed plate 111 and movable plate 114, when the latter is in its quiescent position, is related to the spacing of guard circuit 112 to fixed plate 111. These spacings are set so that in an unactuated condition of the switch signals capacitively coupled from guard circuit 112 to fixed plate 111 predominate whereas in an actuated condition signals coupled from movable plate 114 to fixed plate 111 predominate.

Pushbutton 140 lies in a plane which is perpendicular to fixed plate 111 and movable plate 114 and is separated from the movable plate 114 by the fixed plate 111. Pushbutton 140 is movable between a quiescent position and a depressed position along a path perpendicular to the movable plate 114. The range of travel of the push-button 140 between the quiescent position and the depressed position must be larger than the corresponding range of travel of the movable plate 114 and is on the order of one-sixteenth to one-eighth of an inch. This difference in the ranges of travel ensures that movable plate 114 does not become locked in its operating position once pushbutton 140 is depressed.

Pushbutton 140 is comprised of a key 130 which has affixed thereto a plunger 131. On the bottom of plunger 131 there is attached a barium ferrite permanent magnet 133. The plunger 131 is of a hollow cylindrical shape with the inside diameter being slightly smaller than the outside diameter of magnet 133. This small difference in diameters permits magnet 133 to be force-fitted to plunger 131. Around the inside circumferential surface of plunger 131, slightly recessed from the end of the plunger 131, is a magnet alignment lip 134. The depth of the recess is approximately one-half to it. In this case coincidence gate 154 only provides output spikes at the pulse edges of the two input waveforms.

In the capacitive embodiment of the switch dielectric film 120 is interposed between fixed plate 111 and movable plate 114. This dielectric material increases the capacity between fixed plate 111 and movable plate 114 as movable plate 114 is snapped from its quiescent position to its operating position. Again the effect is a decrease in the impedance between fixed plate 111 and movable plate 114 with the end result being that the inverted clock signal $\overline{CL}$ applied to movable plate 114 is capacitively coupled to fixed plate 111 swamping out the capacitively coupled clock signal CL applied to fixed plate 111 by a factor of about twenty to one. The capactive mode of operation with its inherently higher operating impedances than those available in the resistive mode allows for extremely low power operation of the switch.

As was the case with the resistive embodiment, the signal coupled out of fixed plate 111 to one input of coincidence gate 154 is the inverted clock signal $\overline{CL}$. Since the other input of coincidence gate 154 is supplied directly with an inverted clock signal, coincidence gate 154 is actuated providing an output signal shown as waveform A in FIG. 3.

It should be noted that if the switch were originally configured for resistive operation through the advantageous omission of dielectric film 120 and subsequently a non-conductive coating forms over either fixed plate 111 or movable plate 114 or both, the switch will still properly operate but in a capacitive mode. Conversely, if the dielectric film 120 should develop any breaks or abrasions therein sufficient to permit fixed plate 111 and movable plate 114 to come in contact with one another, the switch will still properly operate in a resistive mode. Accordingly, the switch is virtually failure proof.

The output of coincidence gate 154 is applied to an integrator 160 which in turn is connected to a threshold detection amplifier 163. Integrator 160 is a resistive-capacitive network comprised of series resistor 161 and shunt capacitor 162. In a key up condition the spikes out of coincidence gate 154 are not of sufficient time duration to allow any appreciable build-up of voltage on capacitor 162 which will trigger threshold detection amplifier 163. In a key down position, however, the output pulses from coincidence gate 154 are of sufficient time duration to allow a build-up of voltage across capacitor 162. This effect is shown as waveform B in FIG. 3. When a sufficient voltage level is developed across capacitor 162, this level being set in accordance with the threshold level which will trigger threshold detection amplifier 163, the threshold detection amplifier 163 fires and an output pulse is produced. The output pulse continues in time duration from the time key 130 is first depressed until it is released. This output signal from threshold detection amplifier 163 provides the indication that the switch has been operated. It should be noted that all of the above electronic circuitry is readily implemented on a single chip integrated circuit. Consequently, the electronic circuitry is extremely simple and inexpensive to fabricate.

In all cases it is understood that the above described embodiment is illustrative of but a small number of the many possible specific embodiments which can represent applications of the principles of the invention. Thus, numerous and varied other embodiments can readily be devised in accordance with these principles by those skilled in the art without departing from the spirit and scope of the invention.

What is claimed is:

1. A pushbutton switch comprised of
a movable magnet,
first and second electrically conductive members, the first of said members including
a movable magnetic member,
a conductive support strip, and
first and second cantilever springs permanently connecting said movable magnetic member to said support strip, said springs exerting a spring force as a function of flexure distance on said movable magnetic member which is less than a predetermined magnetic force as a function of separation distance exerted by said movable magnet on said movable magnetic member,
a film of dielectric material covering said second electrically conductive member, and
means, responsive to the movement of said magnet within a predetermined distance of said first conductive member, for altering a capacitive impedance between said conductive members, said altering of capacitive impedance effected by magnetic attraction of said first conductive member whereby said first member is displaced to a position adjacent to said film of dielectric covering said second conductive member to produce a capacitive switch actuation.

2. The pushbutton switch in accordance with claim 1 further including
a pushbutton affixed to said movable magnet, said pushbutton lying in a plane perpendicular to parallel planes containing said first and second electrically conductive members and separated from said first conductive member by said second conductive member, said pushbutton being movable between a quiescent position and a depressed position along a path perpendicular to said first conductive member, and
means for preventing particulate contaminants from coming into contact with said first and second conductive members.

3. The pushbutton switch in accordance with claim 2 wherein the pushbutton further includes
a key,
a plunger affixed to said key, and
means for returning said key to said quiescent position following a key depression.

4. The pushbutton switch in accordance with claim 3 in which
there are provided means, included in said plunger, for maintaining an end face of said magnet in a plane parallel to first and second parallel planes containing said first and second conductive members.

5. The pushbutton in accordance with claim 1 further including
circuitry for detecting said altered capacitive impedance between said first and second conductive members upon the movement of said movable magnet and said movable member.

6. The pushbutton switch in accordance with claim 5 wherein the circuitry for detecting the altered capacitive impedance includes the thickness dimension of magnet 133. Lip 134 maintains the end face of magnet 133 closest to circuit board 110 in a plane parallel to first and second parallel planes containing fixed plate 111 and movable plate 114, respectively. Maintaining this parallel alignment insures a uniform magnetic force being applied to the surface area of movable plate 114.

A silastic rubber cup spring 132 surrounds the plunger 131 and is sandwiched between key 130 and circuit board 110. Cup spring 132 maintains key 130 in its quiescent position and, moreover, is designed to provide a "fall-through" feel as the key 130 is depressed.

Figure 2:
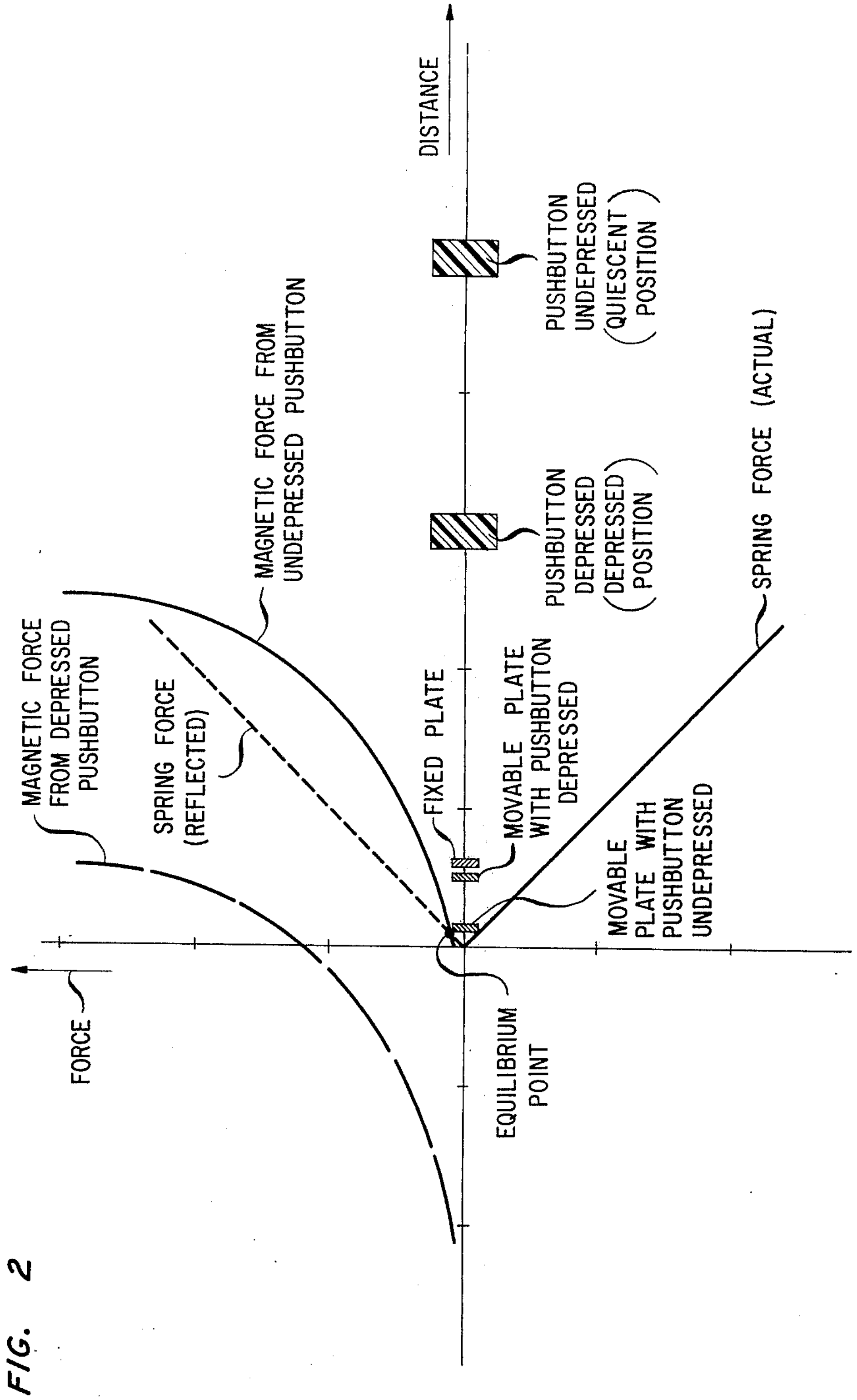
FIG. 2 is a force versus distance diagram of magnetic force exerted by the permanent magnet and spring force exerted by the cantilever springs.

The snap-action operation of the switch is best understood by referring to FIG. 2. Shown therein is a plot of force versus distance on linear scales for both the permanent magnet 133 and the cantilever springs 115 and 116. The magnetic force is the force exerted on a magnetic object a given distance from the lower end face of magnet 133. This attractive force of magnet 133 decreases as the separation distance between magnet 133 and the magnetic object increases. The spring force is the return force exerted on movable plate 114 as it is moved upward toward circuit board 110 away from a position of equilibrium in the plane of support strip 113.

It should be readily observed that the force exerted by the permanent magnet 133 as a function of distance is non-linear whereas the force exerted by the cantilever springs 115 and 116 follows Hooke's law and is linear. The force exerted by cantilever springs 115 and 116 is oppositely directed to that exerted by permanent magnet 133 and this difference is shown in FIG. 2 since spring force is plotted in the second quadrant of the graph whereas magnetic force is plotted in the first quadrant.

Two plots of magnetic force are shown in FIG. 2. The solid plot is the attractive force exerted by magnet 133 when pushbutton 140 is in an undepressed position. The dashed plot is the attractive force exerted by magnet 133 when pushbutton 140 is in a depressed position. Depression of pushbutton 140 results in a mere shifting of the attractive force and this effect is shown by the two plots of magnetic force in conjunction with the two schematic representations of pushbutton 140. It should be further noted that the magnetic force associated with pushbutton 140 in the depressed position is plotted as a function of negative distance for a segment of the plot. This results from the arbitrary selection of the plane containing support strip 113 as a zero reference position.

A comparison of the two forces exerted on movable plate 114 is more easily understood by reflecting the spring force about the abscissa of the graph. The point where the spring force and magnetic force coincide represents an equilibrium point for movable plate 114 which in turn signifies that pushbutton 140 is in an undepressed or quiescent position.

Depression of pushbutton 140 from its quiescent position to its depressed position, as noted above, moves permanent magnet 133 closer to movable plate 114. The movement of pushbutton 140 and permanent magnet 133 is in a plane perpendicular to a plane containing movable plate 114. Movement of permanent magnet 133 closer to movable plate 114 causes the magnetic force to shift and thereby increase with respect to the spring force. As the magnetic force increases it reaches a point where it completely overcomes the spring force exerted by cantilever springs 115 and 116, with the effect that the movable plate 114 is snapped into a position juxtaposed to fixed plate 111 thereby producing a positive switch actuation.

The return of pushbutton 140 to its quiescent position increases the separation distance between permanent magnet 133 and movable plate 114 thereby again shifting the magnetic force, but in this instance the force exerted by permanent magnet 133 on movable plate 114 is decreased rather than increased. As the magnetic attraction becomes less than the spring force exerted by cantilever springs 115 and 116, the movable plate 114 is snapped back to its equilibrium point thereby producing a positive switch release.

2. Electrical Operation

The electrical operation of the switch, as shown in FIG. 1, revolves around a change in impedance between the fixed plate 111 and movable plate 114 as movable plate 114 moves from its quiescent position to its operating position. This impedance change causes a phase reversal in an interrogation signal coupled out of the fixed plate 111. The phase reversal is readily detected thereby providing an indication that the switch has been operated.

Figure 3:
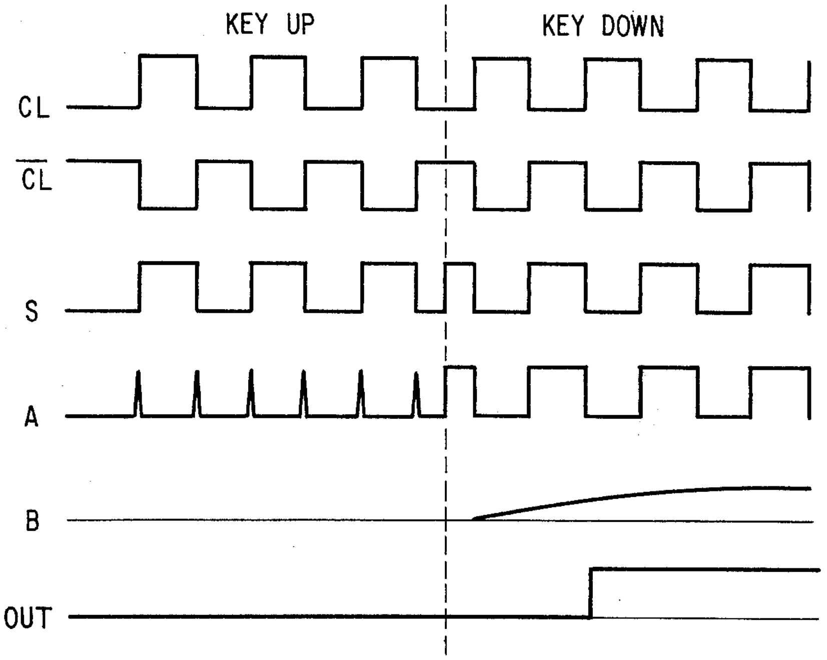
FIG. 3 illustrates electrical waveforms at various points in the electrical circuitry.

An interrogation signal, delivered to fixed plate 111 and shown as waveform CL in FIG. 3, is supplied by clock 150. The clock output signal is applied to guard circuit 112 through circuit 151 and is capacitively coupled to fixed plate 111. Capacitive coupling affects are controlled by the spacing between guard circuit 112 and fixed plate 111 which, in effect, form parallel plates of a capacitor. Clock signal CL, after being inverted in inverter 152 and which is shown as waveform $\overline{CL}$ in FIG. 3, is applied directly to conductive support strip 113 and, hence, to movable plate 114 by circuit 153. The inverted clock signal is also applied to one input of coincidence gate 154 by circuit 158. A second input to coincidence gate 154 is the signal coupled out of fixed plate 111 via circuit 155, non-inverting sense amplifier 156 and circuit 157. Circuit 155 passes through the gap left in guard circuit 112 surrounding fixed plate 111 and is directly connected to fixed plate 111. The signal coupled out of fixed plate 111 as applied to coincidence gate 154 is shown as waveform S in FIG. 3 for both a key up and a key down condition.

In a resistive embodiment of the switch dielectric film 120 is omitted. When key 130 is depressed, movable plate 114 is snapped into metallic contact with fixed plate 111. This metallic contact changes the impedance between fixed plate 111 and movable plate 114 to a much lower value than that which existed in the open or key up condition. The decrease in impedance resulting from the metallic contact of fixed plate 111 to movable plate 114 allows inverted clock signal $\overline{CL}$, applied to movable plate 114, to be directly coupled into fixed plate 111 thereby completely swamping out the capacitively coupled clock signal CL applied to fixed plate 111.

With both inputs to coincidence gate 154 having the same polarity signals thereto, coincidence gate 154 is actuated providing an output signal which is shown as waveform A in FIG. 3. It should be noted that in the key up condition the capacitively coupled clock signal CL is applied to one input of coincidence gate 154 with the other input having inverted clock signal $\overline{CL}$ applied means for applying an in-phase clock signal to said second conductive member, means for applying an oppositely phased clock signal to said first conductive member, and means for sensing the change in phase of a signal coupled out of said second conductive member, said pphase change being produced by said altered capacitive impedance.

7. The pushbutton switch in accordance with claim 6 wherein the means for applying an in-phase clock signal to the second conductive member includes means for generating an in-phase clock signal, a conductive circuit path spaced apart from said second conductive member by a predetermined distance, said conductive path lying in a plane containing said second conductive member and nearly surrounding said second conductive member except for a gap of a specified width, and means for coupling said in-phase clock signal to said conductive circuit path, said in-phase clock signal being capacitively coupled from said conductive circuit path to said second conductive member.

8. The pushbutton switch in accordance with claim 7 in which said means for applying said in-phase clock signal to said second conductive member has an impedance which is greater than the altered capacitive impedance produced in response to the movement of said movable magnet and said movable magnetic member.

9. The pushbutton switch in accordance with claim 6 wherein the means for applying an oppositely phased clock signal to the first conductive member includes means for generating an in-phase clock signal, means for inverting the phase of said clock signal to produce an inverted clock signal at an output of said inverting means, and means for coupling said inverted phase clock signal to said first conductive member.

10. The pushbutton switch in accordance with claim 9 wherein the means for sensing the phase change in the signal coupled out of the second conductive member includes a coincidence gate having a first input coupled to said second conductive member and a second input coupled to said inverting means output;

means for integrating the output signals from said coincidence gate to produce an integrated threshold signal, and a threshold detector circuit for producing a change of state output indication upon a predetermined threshold signal level being reached by said integrated threshold signal, said change of state signifying said capacitive switch actuation.

11. A pushbutton switch comprised of first, second, and third signal leads, means for capacitively coupling signals from said first lead to said second lead, said coupling means having a predetermined impedance to said signals, movable, conductive, magnetic means supported adjacent to said coupling means and connected to said third signal lead, and manually controllable means for magnetically moving at least a portion of said magnetic means sufficiently closer to said coupling means so that the impedance between said second and third leads is much less than the impedance between said first and second leads.

12. The pushbutton switch in accordance with claim 11 wherein the means for capacitively coupling signals from said first lead to said second lead includes means for generating an in-phase clock signal, and means for coupling said in-phase clock signal to said first lead.

13. The pushbutton switch in accordance with claim 12 further including means for inverting the phase of said in-phase clock signal to produce an inverted clock signal at an output of said inverting means, and means for coupling said inverted phase clock signal to said third lead.

14. The pushbutton switch in accordance with claim 13 further including a coincidence gate having a first input coupled to said second lead and a second input coupled to said inverting means output, means for integrating the output signals from said coincidence gate to produce an integrated threshold signal, and a threshold detector circuit for producing a change of state output indication upon a predetermined threshold signal level being reached by said integrated threshold signal, said change of state signifying switch actuation.

15. The pushbutton switch in accordance with claim 11 wherein the manually controllable means includes a plunger, a key affixed to one end of said plunger, a permanent magnet affixed to an opposite end of said plunger, said magnet having an end face lying in a plane parallel to first and second parallel planes containing said second and third leads and interposed between said key and said first and second parallel planes, and means for returning said key to a quiescent position following a key depression.

* * * * *